(12) United States Patent
Takahashi

(10) Patent No.: US 6,426,760 B1
(45) Date of Patent: Jul. 30, 2002

(54) INFORMATION PROCESSING APPARATUS, AREA SELECTION CONTROL METHOD AND STORAGE MEDIUM

(75) Inventor: Hideki Takahashi, Fuchu (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/283,915

(22) Filed: Apr. 1, 1999

(30) Foreign Application Priority Data

Aug. 11, 1998 (JP) .......................................... 10-227397

(51) Int. Cl.[7] .................................................. G06F 3/00
(52) U.S. Cl. ........................................ 345/788; 711/200
(58) Field of Search ................................. 345/333, 335, 345/339, 342, 336, 356, 357, 762, 765, 744, 764, 788, 705, 853, 854; 711/200, 202

(56) References Cited

U.S. PATENT DOCUMENTS 5,732,230 A * 3/1998 Cullen et al. ................ 345/339
5,883,624 A * 3/1999 Teramura et al. ........... 345/339

\* cited by examiner

*Primary Examiner*—Cao H. Nguyen
(74) *Attorney, Agent, or Firm*—Staas & Halsey LLP

(57) ABSTRACT

An information processing apparatus and method for controlling selection of data displayed on a display device. A desired area of the displayed data is selected using an input device, and a processor compares a size corresponding to the selected desired area to a maximum storage capacity of a memory device that stores the selected desired area. The processor controls the size of the selected desired area not to exceed the maximum storage capacity of the memory device.

29 Claims, 6 Drawing Sheets

INFORMATION PROCESSING APPARATUS, AREA SELECTION CONTROL METHOD AND STORAGE MEDIUM

CROSS REFERENCE TO RELATED APPLICATIONS

This application is based upon and claims priority from Japanese Patent Application No. 10-227397, filed Aug. 11, 1998, the contents of which are incorporated herein by reference.

BACKGROUND OF THE INVENTION

1. Field of the Invention

The present invention relates to an information processing apparatus, such as a computer, which allows a user to select a desired area from data displayed on a display unit, and more particularly, the present invention relates to an information processing apparatus and method for controlling an area selecting process, and a storage medium that stores a program which causes the apparatus to execute control of an area selection.

2. Description of the Related Art

A computer which displays image data on a screen of a display unit and thereby executes editing of the displayed image data is generally known. Application programs which cause the computer to execute the editing process are available to users in the form of a storage medium, such as a CD-ROM. The application program is read by the computer through a drive unit and is then loaded to a memory of the computer, enabling the computer to execute editing processes using the application program.

In an image data editing process, a user either selects an object area that is to be processed and thereafter executes a predetermined process for the selected area, or, after selecting the predetermined process, selects the object area for execution of the process.

When selecting the object area that is to be processed, a user manipulates anchors that are displayed along with image data on a display screen using an input device such as a keyboard and a mouse. For example, the user manipulates four anchors defining four corners of a rectangle, so that the rectangle is be placed within a predetermined area, or range of the image data.

As an alternative to using the keyboard and mouse to manipulate the anchors as described above, touch panels are mounted on the display screen of the display unit to enable the user to directly manipulate the anchors through contact with the touch panel on the display screen of the computer.

The editing process includes a process of storing data corresponding to the selected area in a portable type storage medium, such as a floppy disk, as a new file, along with a copying process and a deleting process associated with the selected area.

It is assumed that the image data of the object to be processed explained above is data obtained by either opening a file stored in the storage medium and loading the data in the memory, or reading a document with an image scanner and then loading the data in the memory.

There are known to be certain problems associated with the process of storing data, corresponding to a selected area, in a storage medium as a new file. For example, floppy disks, which storage media most generally used in the storing process, have a maximum storage capacity of about 1M byte, which is a relatively small storage capacity. Therefore, when manipulating the anchors to select the object area to be processed to execute the selection process for data to be stored, a user is must be able to recognize the size of the data selected to determine whether the selected area can be stored in the storage medium.

When storing the data of the selected area to the storage medium as a file, a user is requested to re-execute the area selection process and the storing process if the capacity of the file exceeds the storage capacity of the storage medium.

When image data is obtained as the object to be processed through reading of a document with an image scanner, the image data is read from the document with a lower resolution and is displayed on the screen of the display unit. The user manipulates the anchors as explained above to select the predetermined area of the data to be stored, and only the selected area of the document is read by the image scanner, setting the resolution to the desired value.

In this case, as explained above, the user must perform the manipulation for selecting an area using the anchors to set the data to a size which can be stored in the storage medium. When the amount of relevant data corresponding to the area selection exceeds the storage capacity of the storage medium and data can no longer be stored in the data storing process, the user is required to re-execute the processing procedures described above. In this way, the user must execute further manipulation procedures in addition to the manipulation procedures involved in the selection and storing process, increasing the required number of manipulations and making the process more burdensome.

Furthermore, when image data is obtained as the object to be processed through the reading of a document with an image scanner, the amount of the document that can be read is dependent upon the maximum storage capacity of the storage medium, or floppy disk, and therefore the data stored cannot exceed the storage capacity of the floppy disk. As a result, if the area of the document to be stored as a file is larger than the maximum storage capacity of the floppy disk, a portion of the document to be stored as the file by the user cannot be included as the selected image data, so that the storing process described above cannot be executed in some cases. Moreover, problems can still arise even when the size of the image data read from the document is less than the maximum storage capacity of the storage medium, so that the stored data includes the selected data. For example, if a file has previously been stored in the storage medium, since the previously stored file occupies a certain amount of the storage space of the storage medium, the storage capacity of the storage medium is reduced to less than the maximum storage capacity, and therefore the user would be unable to store the desired data.

SUMMARY OF THE INVENTION

It is therefore an object of the present invention to provide an information processing apparatus which reduces the amount of manipulation required.

It is a further object of the present invention to provide an information processing apparatus that allows a user to select data corresponding to a desired selected area without having to consider a maximum size to be selected.

It is another object of the present invention to provide an information processing apparatus that controls selection of image data by a user with respect to the type of image data displayed.

Objects of the invention are achieved by an information processing apparatus that includes a display device that displays data and an input device for selecting a desired area of the data displayed by the display device. A memory device stores the selected desired data, and a processor compares a size of the selected desired area to a maximum storage capacity of the memory device. The processor controls the size of the selected desired area not to exceed the maximum storage capacity of the memory device.

In a preferred embodiment of the present invention, if the size of the selected desired area exceeds the maximum storage capacity of the memory device, the processor maintains a previously stored selected desired area.

In yet another preferred embodiment of the present invention, when the display data is image data, the input device selects the image data corresponding to one of either color image data or monochrome image data, and the processor controls the size of the selected desired area in response to the selected image data.

Objects of the present invention are also achieved by a storage device for storing programs causing a computer to select a desired area of data displayed on a display device that includes the process of setting a maximum size of an area that can be selected; detecting a size of the desired area selected; and controlling the size of the desired area selected not to exceed the maximum size of the area that can be selected.

BRIEF DESCRIPTION OF THE DRAWINGS

These and other objects and advantages of the invention will become apparent and more readily appreciated from the following description of the preferred embodiments, taken in conjunction with the following drawings, of which.

DETAILED DESCRIPTION OF THE PREFERRED EMBODIMENTS

Reference will now be made in detail to the preferred embodiments of the present invention, examples of which are illustrated in the accompanying drawings, wherein like numerals refer to like elements throughout. The embodiments are described below in order to explain the present invention by referring to the figures.

Figure 1:
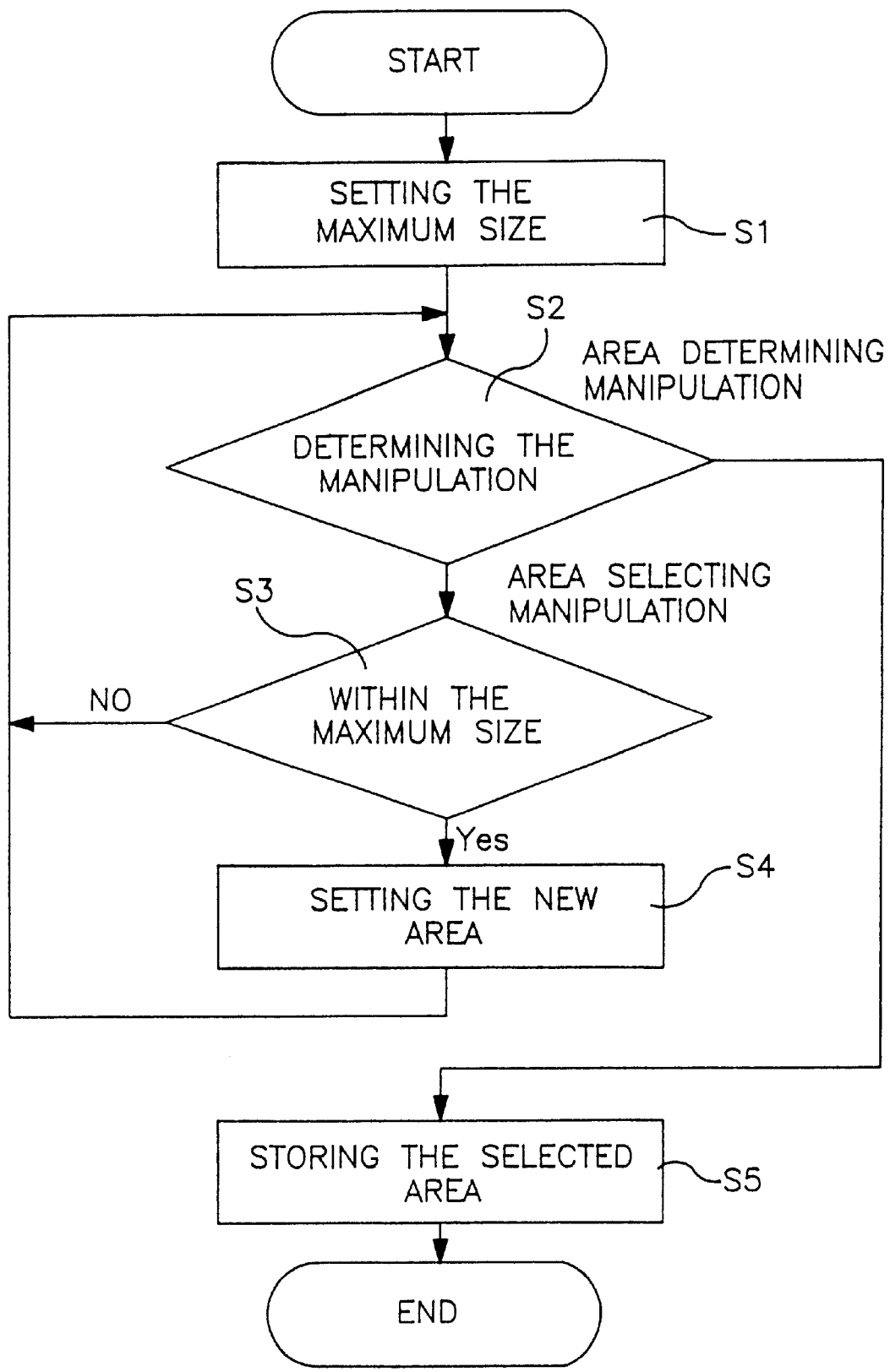
FIG. 1 is a flowchart of a method for controlling an area selecting process according to a preferred embodiment of the present invention.

FIG. 1 is a flowchart of a method for controlling an area selecting process according to a preferred embodiment of the present invention. As illustrated in FIG. 1, information regarding a maximum size of an area that can be selected is first set by a setting unit in step S1. A determination is then made in step S2 as to whether a user manipulation corresponds to an area selection or an area determination. If it is determined in step S2 that the manipulation corresponds to an area determination, a previously selected area is stored in step S5 and the process ends. However, if the manipulation is determined to be associated with an area selection, a size of the selected area manipulated by the user is detected by a detecting unit in step S3 to determine whether the selected size requires manipulation that exceeds the maximum size that can be selected.

When the size of the selected area resulting from the area selecting manipulation of the user is determined to exceed the maximum size, the size of the selected area is controlled by a control unit so that it does not exceed the maximum size. For example, when the size of the selected area in step S3 does not exceed the maximum size, the area selected by user manipulation is defined as a new selected area in step S4, and when the size exceeds the maximum size, the area selected by user manipulation is canceled and a preceding selected area is maintained.

Figure 2:
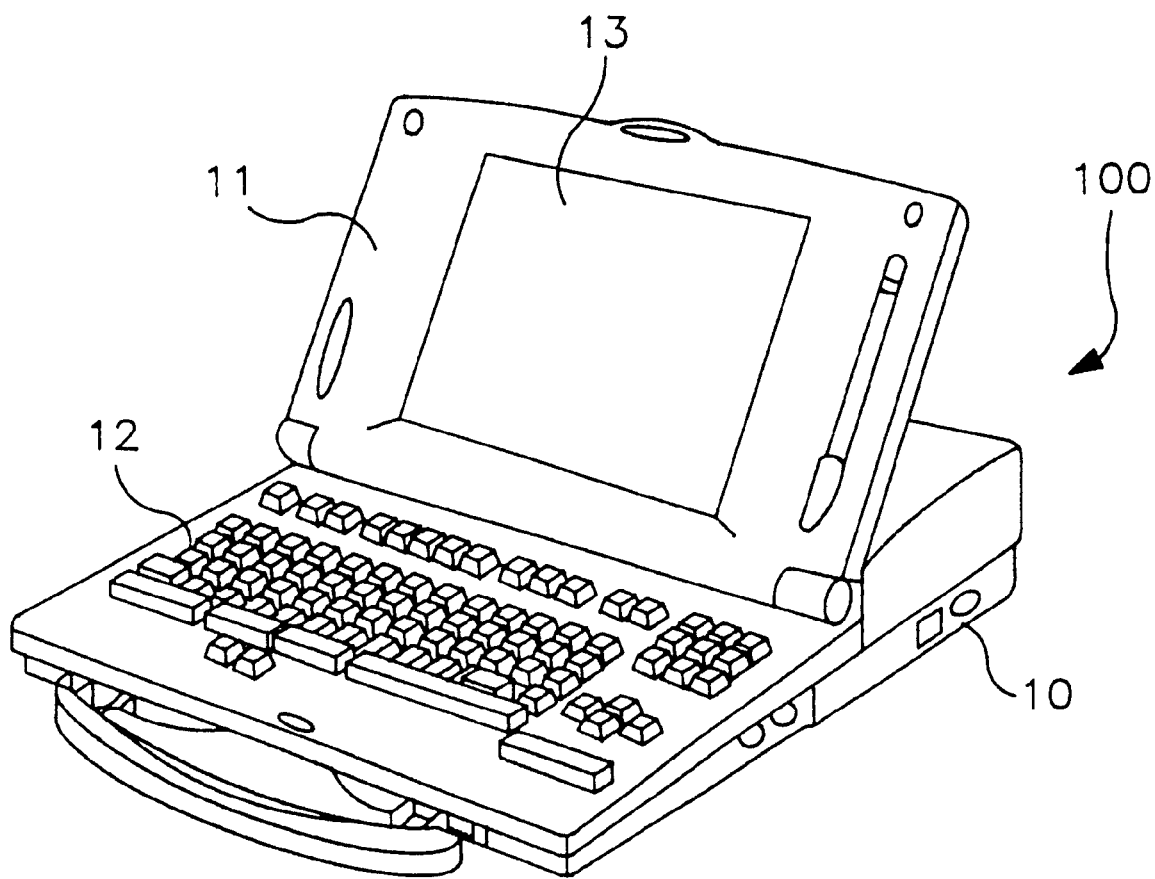
FIG. 2 is a perspective view of a word processor device, according to a preferred embodiment of the present invention, that utilizes the area selecting control method.

FIG. 2 is a perspective view of a word processor device 100, according to a preferred embodiment of the present invention, that utilizes the area selecting control method of the present invention. As illustrated in FIG. 2, the word processor 100 includes a main unit 10, a display screen 13 located on a display unit 11, and a keyboard 12. The main unit 10 is formed of hardware which will be described later. The display unit 11 displays various kinds of data on a display screen, and may also include a touch panel that is used as an input device to input instructions as a result of direct manipulation of the touch panel by a user.

The keyboard 12 includes a plurality of character keys and arrow keys, and is used to input characters to generate a document and to select predetermined items from selection items displayed on the display unit 11.

Figure 3:
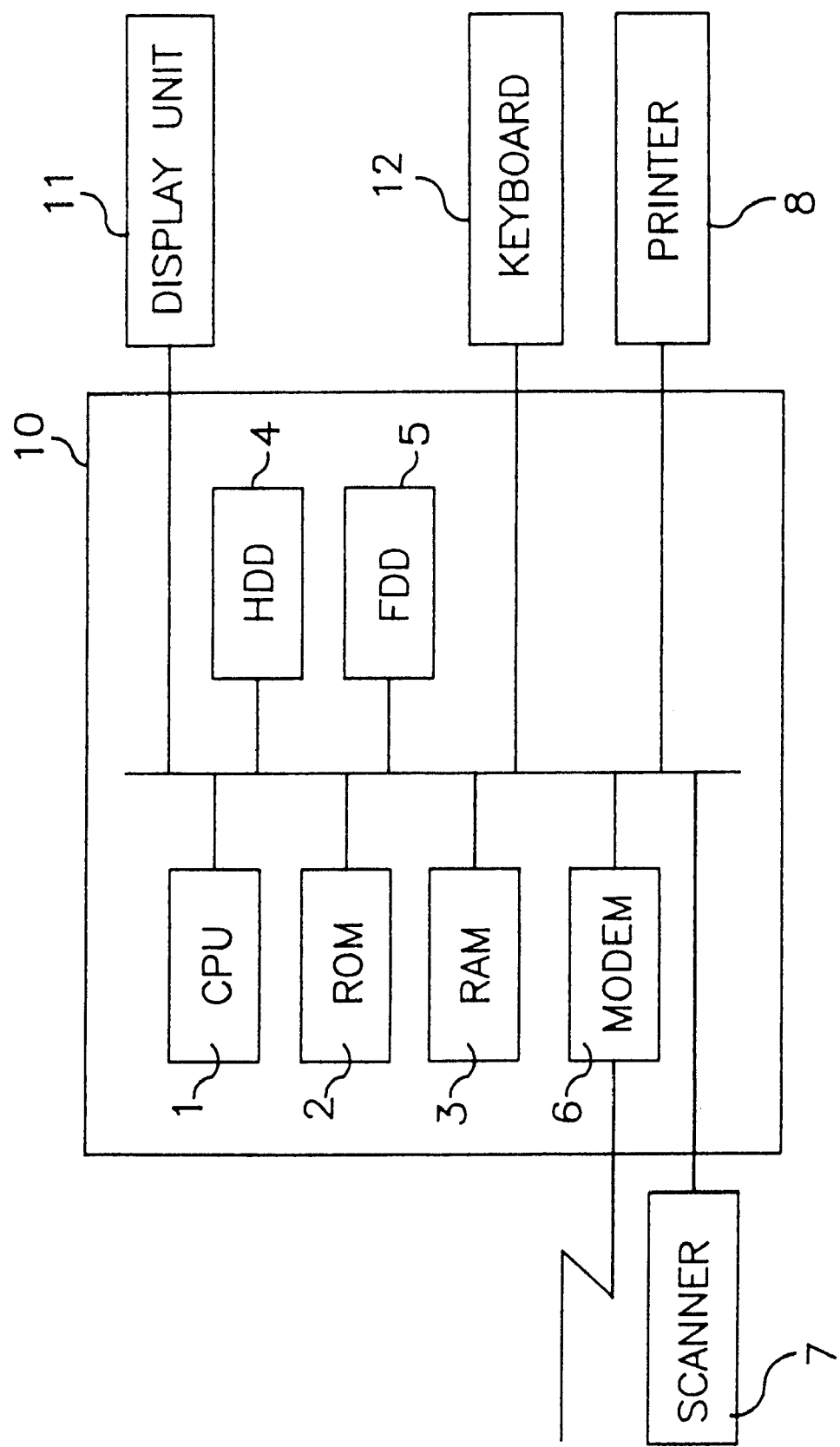
FIG. 3 is a schematic diagram of the word processor, according to the preferred embodiment of the present invention.

FIG. 3 is a schematic diagram showing the word processor 100 according to the preferred embodiment of the present invention. As illustrated in FIG. 3, the main unit 10 of the word processor 100 includes a CPU 1, a ROM 2, a RAM 3, a hard disk drive ("HDD") 4, a floppy disk drive ("FDD") 5, a modem 6, an image scanner 7 and a printer 8, all of which are connected with each other through a bus for data transfer.

The CPU 1 executes various types of processes under the control of programs and can also be used for various kinds of processes and controls by the programs of the present invention.

The ROM 2 is used to store programs to execute various kinds of processes and controls with the word processor 100 of the present invention. The programs stored in the ROM 2 are read and executed when a power switch (not shown) is turned ON and when an instruction to execute various processes is issued.

The RAM 3 is used to temporarily store data for various processes and controls, and to store data to be displayed on the display unit 11. In addition, the RAM 3 is also used to store image data read by the image scanner 7 and develop printing data to enable printing to be performed by the printer 8.

The hard disk drive 4 and floppy disk drive 5 store programs, control data, and generated document and image data to a non-volatile storage medium, such as a hard disk, or a floppy disk.

The modem 6 is used to exchange data with other devices through a telephone line, and is also used for transmission and reception of electronic mail and facsimile data. The modem 6 can also be used to download programs and data from a remote server.

The scanner 7 is used to read the contents of a document and to define the contents as image data, while the printer 8 is used to print generated documents and image data.

Programs of the present invention stored in and read from the ROM 2 to execute processes of the present invention by controlling the word processor 100 with the CPU 1. While the programs of the present invention are stored in the ROM 2 of the word processor 100, it is also possible, as in a known computer system, that the programs of the present invention are previously stored in the storage medium, such as the hard disk or the floppy disk. The programs are read and then loaded to the RAM 3 using the corresponding hard disk drive 4 and floppy disk drive 5, respectively, and the processes of the present invention are executed by executing the programs loaded to the RAM 3.

Figure 4:
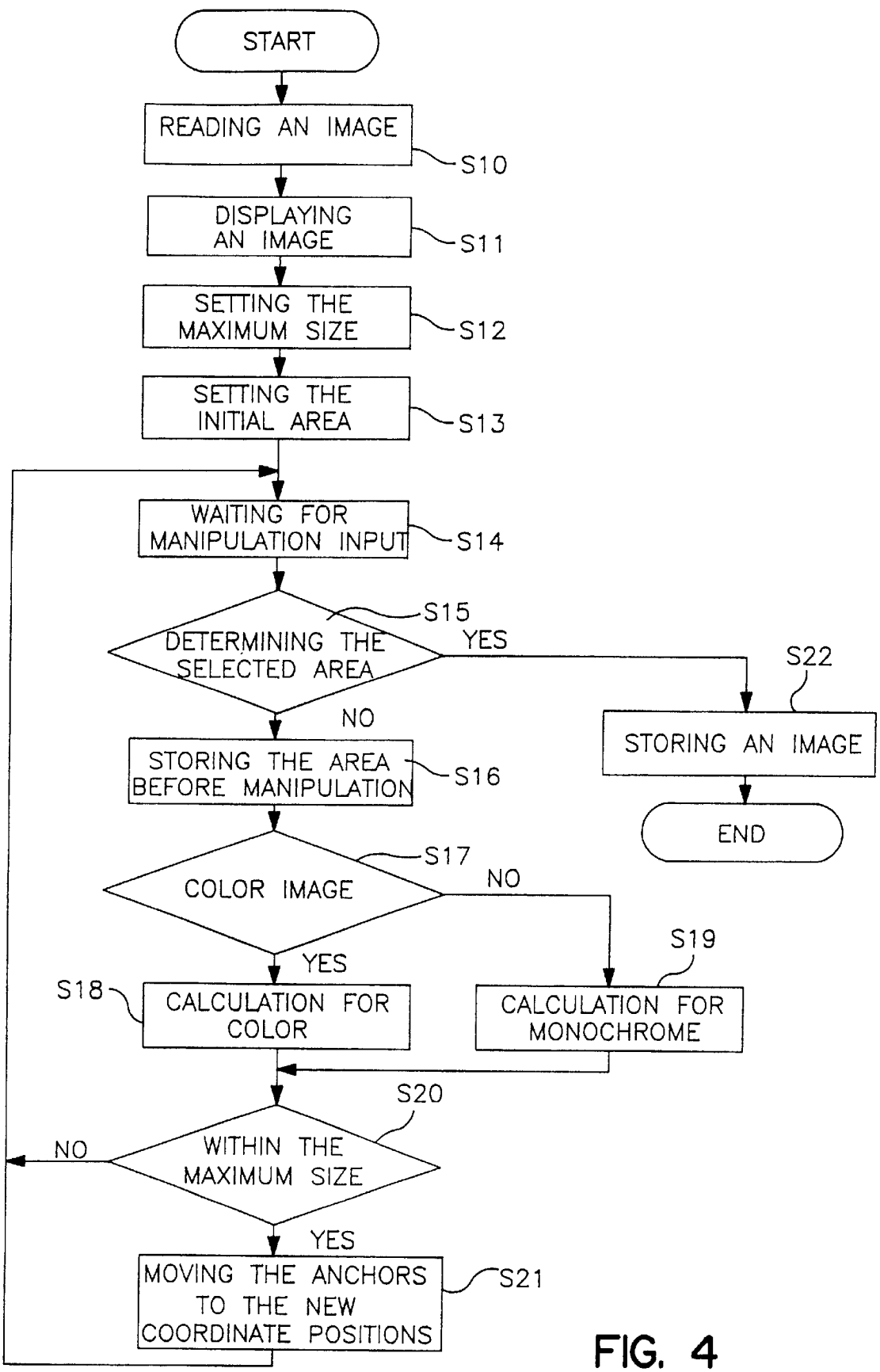
FIG. 4 is a flowchart of an area selecting process according to a preferred embodiment of the present invention.

FIG. 4 is a flowchart of an area selecting process according to the preferred embodiment of the present invention. The process is executed so that after contents of a document are read by the scanner 7 in order to generate image data, a user stores the desired portion of the image data to the floppy disk as a file with an instruction for selection.

First, image data is generated in step S10 by reading a document using the scanner 7 and storing the read document in the RAM 3 of the word processor 100. The generated image data is displayed on the display screen of the display unit 11 in step S11.

Prior to reading the document using the scanner 7, a user is requested to designate whether the document should be read as color data or monochrome data.

A maximum size which may be designated by a user from the image data displayed on the display screen 13, corresponding to the maximum capacity that may be stored, is set in step S12.

Figure 5A:
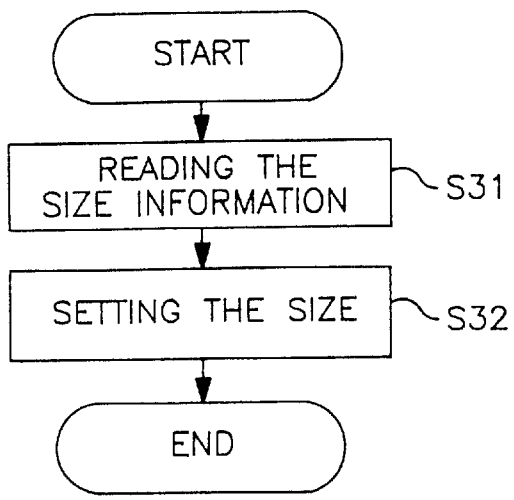
FIGS. 5A–5C are flowcharts of a maximum size setting process according to a preferred embodiment of the present invention.
Figure 5B:
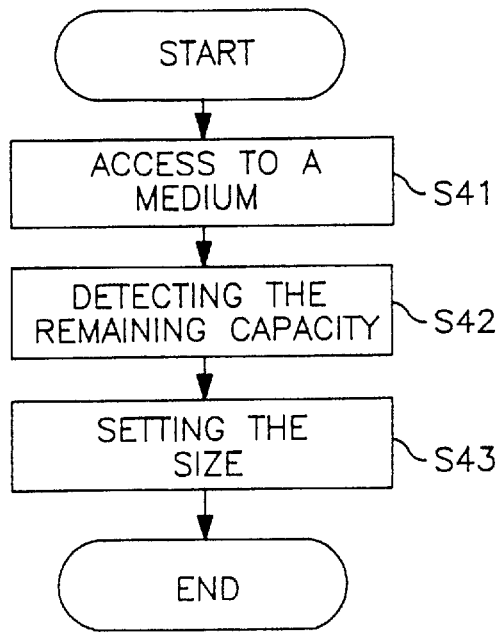
Figure 5C:
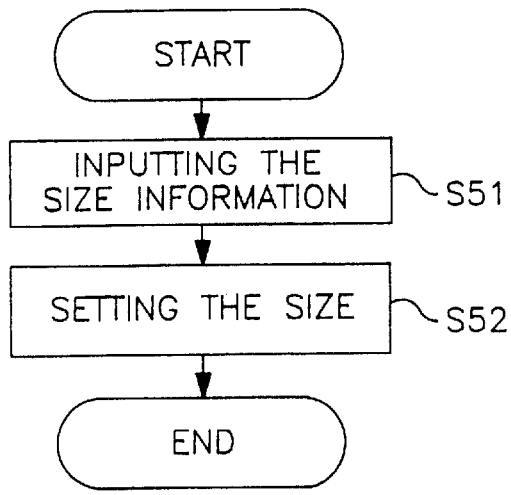

FIGS. 5A–5C are flowcharts of a maximum size setting process according to a preferred embodiment of the present invention.

A process for setting the maximum capacity that may be stored, which corresponds to information regarding the maximum size designated by user, is illustrated in FIGS. 5A–5C. FIG. 5A is a flowchart illustrating the process to set the information about the size of the selected area that was specified previously, while FIG. 5B is a flowchart illustrating the process to set the information associated with the size of the area corresponding to the remaining capacity of the storage medium used to store the selected area as a file, and FIG. 5C is a flowchart illustrating the process to set the information corresponding to the size that is input freely by the user.

In the size setting process illustrated in FIG. 5A, the size information stored in the ROM 2 is read in step S31. For example, when a floppy disk is used to store the image data, the maximum storage capacity information (for example 1.2M bytes) of the floppy disk is first stored as size information in the ROM 2. The size information is then read from the ROM 2 and used to set information to be used for control of an area selecting manipulation in step S32.

In addition, as illustrated in FIG. 5B, when storage space is occupied by a file that was previously stored in the storage device, information corresponding to the size of the area selected may also be set to correspond to the storage capacity remaining in the storage medium, or floppy disk, that is available to store the image data. The available storage capacity is obtained in step S41 by accessing the storage medium used for storing data and detecting the remaining storage capacity of the storage medium in step S42.

After the remaining storage capacity of the storage medium is detected, information regarding the size of the area selected is set based on the detected storage capacity in step S43.

As illustrated in FIG. 5C, it is also possible for information regarding the size of the area selected be input by a user. In this case, a message is displayed on the display screen 13 of the display unit 11 requesting input of information regarding the size to be used to control area selection in step S51 in order to cause a user to input the information about the desired size.

For example, a message "Input the maximum capacity for the area selecting manipulation" is displayed on the display screen, waiting for input of a numerical value by a user for the predetermined data input area. The numerical data input by the user is then set as the maximum size capacity for controlling the area selecting manipulation in step S52.

Referring again to FIG. 4, after the information regarding the maximum size of the area selected is set as described above, a display object, commonly referred to as an "anchor" and which and is included with the image data displayed on the display screen 13, is manipulated by the user to perform area selection according to the area size of the initial setting in step S13.

Figure 6:
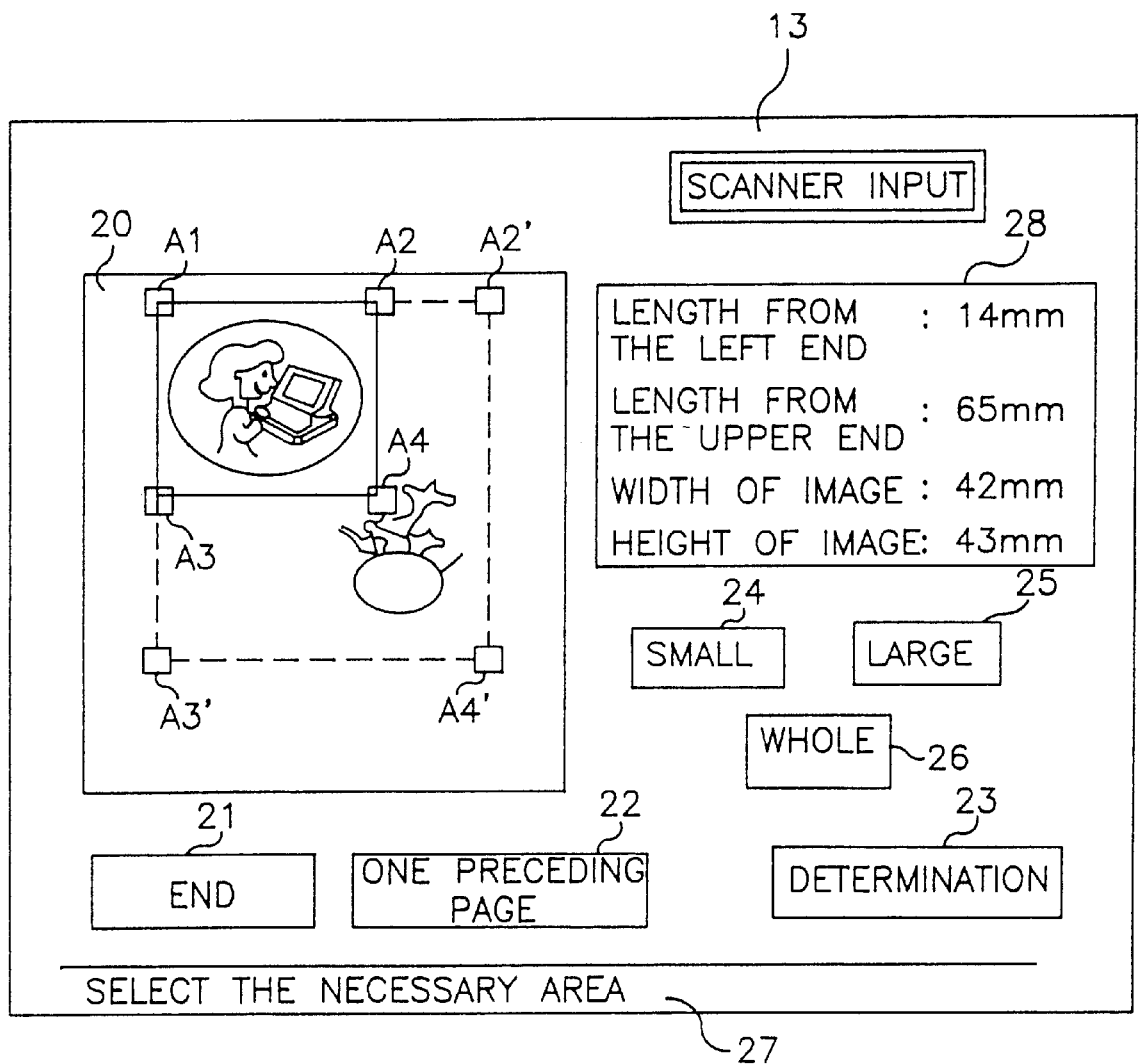
FIG. 6 is a schematic diagram of a display on a display screen of the word processor according to the preferred embodiment of the present invention.

For example, FIG. 6 is a schematic diagram of a display on the display screen 13 of the word processor 100 according to the preferred embodiment of the present invention. As illustrated in FIG. 6, anchors A1–A4 are displayed at positions corresponding to four corners of a rectangular region. An area in the rectangular region enclosed when the four anchors A1–A4 are connected is indicated as the selected area. The coordinate positions of each of the anchors A1–A4 are stored.

Anchors A1–A4 are displayed along with image data of a document read by the scanner 7 in an image data display area 20 of the display screen 13, as described above. The user selects a desired area of the image data by manipulating the movement of a designated anchor. Each of the anchors A1–A4 move in conjunction with manipulation of another anchor, and anchors located at two corners adjacent to a corner in which an anchor to be manipulated is positioned are moved in conjunction with each other.

An "END" button 21 issues an instruction to complete a current process and then return, for example, to the initial image, and a "ONE PRECEDING PAGE" button 22 issues an instruction to return to a preceding image of a current image (for example, a display image for reading manipulation input by the scanner 7). Moreover, a "DETERMINATION" button 23 determines the selected area indicated by anchors A1–A4 through manipulation of the anchors A1–A4. When the "DETERMINATION" button 23 is depressed, a process is executed to store data in the area indicated by anchors A1–A4 in the storage medium.

The display also includes a "SMALL" button 24, a "LARGE" button 25 and a "WHOLE" button 26. When the "SMALL" button 24 is depressed, the area defined within current anchors A1–A4 is fixed, and each anchor A1–A4 is moved to a position where the rectangular area indicated by the anchors A1–A4 is similar but reduced in size. In the same manner, when the "LARGE" button 25 is depressed, the area defined within current anchors A1–A4 is fixed, and each of the anchors A1–A4 is moved to a position where the rectangular area indicated by anchors A1–A4 is similar but increased in size. In this way, anchors A1–A4 are moved in units of one pixel, for example, in a direction determined by whether an instruction is received from the "SMALL" button 24 or the "LARGE" button 25.

Moreover, when the "WHOLE" button 26 is depressed, the area defined within current anchors A1–A4 is fixed, and each of the anchors A1–A4 is moved to obtain a similar rectangular area that requires an available storage amount corresponding to the maximum storing data capacity.

Manipulation guidance for the user is displayed in a message display area 27. For example, the message display area 27 illustrated in FIG. 6 suggests that the user select the area by manipulating the anchors.

The display also includes a selected area information display area 28 that displays information regarding the selected area obtained by the anchors A1–A4, including the "length from the left end" obtained from an x-coordinate value of the coordinate position of anchor A1, "length from the upper end" obtained from a y-coordinate value, "width of image" obtained from a difference between x-coordinate values of coordinate positions of anchor A1 and anchor A4, and "height of image" obtained from a difference between y-coordinate values. The coordinate values are, for example, indicated in predetermined units (mm). Which portions of the length information that are obtained is dependent on a reading resolution of the image data.

Referring once again to FIG. 4, after the anchors A1–A4 are displayed in the initial setting size of the area selection, and the user makes an input manipulation in step S14, a determination is made in step S15 as to whether the input manipulation by the user is for determining the selected area.

When the input manipulation of the user is performed to move the anchors A1–A4, rather than to determine the selected area, the coordinate position of the anchors A1–A4 prior to the manipulation is held in step S16. A determination is then made in step S17 as to whether the document has been read using a color data setting or a monochrome data setting, and thereafter a capacity calculation is made for data corresponding to the selected area based on the setting.

For example, when the document is read using the color data setting, the capacity of the data corresponding to the area selected is obtained in step S18 using the following calculation.

First, the color image data uses five bits for each RGB element of one pixel (dot) and moreover the color information of one pixel is indicated by 16 bits (two bytes) in combination with the vacant data of one bit.

Therefore, the result obtained by multiplying two bytes with the number of pixels in the area selected by the anchors becomes equal to the capacity of data in the selected area. Namely, the data capacity (number of bytes) in the selected area can be obtained from the formula, (difference between coordinate positions of anchors in the x-direction (horizontal direction)+1)×(difference between coordinate positions of anchors in the y-direction (vertical direction)+1)×2.

Moreover, when the document is read using the monochrome data setting rather than the color data setting, the capacity of the data in the selected area can be obtained in step S19 using the following calculation process.

One pixel (dot) in the monochrome data is expressed by one bit, defining eight pixels in the horizontal direction as one management unit. Therefore, the monochrome data is managed in unit of eight bits (one byte).

In the monochrome data, data capacity (number of bytes) in the selected area can be obtained using the calculation formula (difference between coordinate positions of anchors in the x-direction (horizontal direction)+7)/8×(difference between coordinate positions of anchors in the y-direction (vertical direction)+1).

As explained above, once a data capacity of the new selected area corresponding to the anchor manipulation of user is obtained, a determination is made in step S20 as to whether the data capacity is within the maximum capacity that is set in step S12. When the data capacity is within the maximum capacity, the anchors are moved to the new coordinate positions in step S21 and are then displayed. When the data capacity of the selected area exceeds the preset maximum capacity, each anchor A1–A4 is displayed at the coordinate positions that were held in step S16.

As a result, when a user attempts to manipulate the anchors A1–A4 to designate an area of data that exceeds the storage capacity of the storage medium, the area selecting manipulation is limited to the storage capacity of the storage medium to prevent such designation.

As described above, execution of the processes of steps S14 to S21 are dependent upon the manipulation of the anchors A1–A4 by the user.

When depression of the "DETERMINATION" button 23 is detected in the determination of step S15, rather than the anchor manipulation being detected, a message to place a floppy disk in the floppy disk drive is displayed, for example, and an input response from the user is detected, which is then stored as the image data file of the selected area in the floppy disk in step S22.

As a result of the processes described above, information corresponding to the maximum size for the selected area is set by manipulating the anchors so that the anchor manipulation by the user is limited depending on the maximum size information.

For example, as illustrated in FIG. 6, when anchor A4 is manipulated so that displayed anchors A1–A4 are moved to the positions of the anchors A1, A2', A3', A4', if the area exceeds the rectangular area obtained by anchors A1–A4, the display positions of the anchors A1–A4 are maintained as they were originally, thereby preventing the area selected from exceeding the preset maximum storage capacity.

When the information corresponding to the maximum size of the area selected by the anchors is set to the maximum storage capacity of the storage medium using the process of the present invention described above, area selection exceeding the storage capacity of a floppy disk becomes impossible, even if a floppy disk that does not contain previously stored files is used to store image data of the area selected by the anchors.

Moreover, when information corresponding to the maximum size of the area selected by the anchors is set so as to correspond to the unused storage capacity (vacant capacity) of the storage medium, area selection that exceeds the remaining available storage capacity cannot be made, such as when a storage medium that contains previously stored files is used to store the image data of the area selected by the anchors.

As described above, since an area selecting manipulation according to the present invention that exceeds the storage capacity of the storage medium is prevented from being performed, data that has a capacity which cannot be stored in the storage medium will not be selected.

As a result, since data can be selected, without having to consider the amount of data that can be stored, the necessary amount of manipulation by the user is reduced, and improved area section selection having excellent flexibility can be realized. Furthermore, as a result of the present invention, the user no longer has to consider the storage capacity required depending on the type of data used as the processing object, prior to selecting an area, further reducing the number of required manipulations by the user.

Although certain preferred embodiments of the present invention have been shown and described, it will be appreciated by those skilled in the art that changes may be made in these embodiments without departing from the spirit of the invention, the scope of which is defined by the following claims.

What is claimed is:

1. An information processing apparatus, comprising:
a display device displaying a data;
an input device selecting a desired area in the data displayed by the display device, the selected desired area having a size that is changeable and defines an operation size;
a memory device storing the selected desired area; and
a processor comparing the operation size to a maximum storage capacity defined within a storage capacity of the memory device and controlling the size of the selected desired area, as changed by the user, by preventing it from exceeding a size that defines an operation size exceeding the maximum storage capacity.

2. The information processing apparatus of claim 1, wherein, if the operation size defined by the selected desired area changed by the user, exceeds the maximum storage capacity of the memory device, the processor maintains a previously stored selected desired area.

3. The information processing apparatus of claim 1, wherein the processor detects a remaining storage capacity of the memory device and controls the size of the selected desired area changed by the user by preventing it from exceeding a size that defines an operation size exceeding the remaining storage capacity.

4. The information processing apparatus of claim 1, wherein the maximum storage capacity of the memory device is selected using the input device.

5. The information processing apparatus of claim 1, wherein the data displayed by the display device is image data of a single digital image, and wherein the selected desired area is a sub-region of the single digital image.

6. The information processing apparatus of claim 5, wherein the input device selects the image data corresponding to one of color image data and monochrome image data, and the processor controls the size of the selected desired area changed by the user in response to the selected image data.

7. The information processing apparatus of claim 6, wherein, if the operation size exceeds the maximum storage capacity of the memory device, the processor maintains a previously stored selected desired area.

8. The information processing apparatus of claim 7, wherein the processor detects a remaining storage capacity of the memory device and controls the size of the selected desired area changed by the user by preventing it from exceeding a size that defines an operation size exceeding the remaining storage capacity.

9. The information processing apparatus of claim 8, wherein the maximum storage capacity is selected using the input device.

10. A method of controlling selection of a desired area of display data, comprising: setting information corresponding to a maximum size of an area that can be selected, based on an available storage capacity of a memory size; comparing a size of the desired area selected with the set maximum size of the area that can be selected, wherein the size is changeable by a user; and controlling the size of the desired area selected by the user, by preventing the size from exceeding the set maximum size of the area that can be selected.

11. The method of claim 10, further comprising storing the size of the desired area selected, wherein, if the size of the stored desired area selected by the user exceeds the set maximum size of the area that can be selected, a previously stored desired area selected is maintained as the desired area.

12. The method of claim 10, further comprising: storing the desired area selected by the user in the memory device having a maximum capacity corresponding to the maximum size of an area that can be selected; and detecting a remaining storage capacity of the memory device, wherein the size of the desired area selected is controlled in the controlling by preventing it from exceeding the detected remaining storage capacity.

13. The method of claim 10, wherein the maximum storage capacity of the memory device is input directly by the user.

14. The method of claim 10, wherein the display data is image data.

15. The method of claim 14, further comprising selecting one of color image data and monochrome image data, wherein the controlling controls the size of the desired area selected by the user in response to the selected one image data.

16. A storage device for storing programs causing a computer to select a desired area of data displayed on a display device, comprising the process of: setting a maximum size of an area that can be selected, based on an available storage capacity of a memory size; detecting a size of the desired area selected by a user, wherein the size is changeable by the user; and controlling the size of the desired area selected by the user by preventing the size from exceeding the maximum size of the area that can be selected.

17. The storage device of claim 16, storing the desired area selected, wherein if the size of the stored desired area selected by the user exceeds the set maximum size of the area that can be selected, a previously stored desired area selected is maintained as the desired area.

18. The storage device of claim 16, further comprising: storing the desired area selected in the memory device having a maximum capacity corresponding to the set maximum size that can be selected; and detecting a remaining storage capacity of the memory device, wherein the size of the desired area selected by the user is controlled by preventing the size from exceeding the detected remaining storage capacity.

19. The storage device of claim 18, wherein the maximum size of the area that can be selected is input directly by a user.

20. The storage device of claim 16, wherein the data displayed on the display device is image data.

21. The storage device of claim 20, further comprising selecting one of either color image data or monochrome image data, wherein the controlling process controls the size of the desired area selected by the user in response to the selected one image data.

22. An information processing apparatus for processing data displayed on a display device, comprising:
an input device selecting a desired area in the data displayed by the display device, the selected desired area having a size that is changeable and defines an operation size;
a memory device storing the selected desired area; and
a processor comparing the operation size to a maximum storage capacity of the memory device and controlling the size of the selected desired area, as changed by the user, by preventing it from exceeding a size that defines an operation size exceeding the maximum storage capacity.

23. A method for limiting display selection, comprising:
selecting an area of a display by defining with user input a boundary of the area; and preventing the user input from enlarging the boundary when the boundary bounds a memory being displayed that has a size one of equaling and exceeding a predetermined maximum memory size.

24. The method according to claim 23, wherein the maximum memory size is predetermined based on one of a size of available memory, a user chosen memory size, and a maximum system memory.

25. A method of selecting a sub-region, comprising:

determining a maximum memory amount;

selecting a first sub-region of a displayed image by moving a pointer, starting at an origin point, to select a sub-region of a displayed image, where the sub-region has a memory amount less than the maximum memory amount; and automatically limiting the moving by preventing the pointer from moving to a limit point, where the limit point and the origin point define a second sub-region having a memory amount greater than the maximum memory amount.

26. A method of selection, comprising:

generating a potential movement of a selection point by manipulating an input device;

determining a potential size of a potential selection corresponding to the potential selection point movement;

realizing the potential selection point movement when the potential size does not exceed a threshold memory amount; and ignoring the potential selection point movement when the potential size exceeds the threshold memory amount.

27. The method according to claim 26, wherein the threshold memory amount is an amount of memory available for processing based on the potential selection point.

28. The method according to claim 27, wherein the processing is one of scanning and storing to a storage device.

29. A method of storing a selection, comprising:

determining an amount of storage space available;

using a graphical user interface to select for storing a sub-area of a region; and automatically restricting the selecting of the sub-area by preventing selection of a sub-area that if stored would require more storage space than the amount of storage space available.

* * * * *